(12) United States Patent
Weissman et al.

(10) Patent No.: US 10,152,508 B2
(45) Date of Patent: *Dec. 11, 2018

(54) IMPROVING A MULTI-TENANT DATABASE QUERY USING CONTEXTUAL KNOWLEDGE ABOUT TENANT DATA

(71) Applicant: salesforce.com, inc, San Francisco, CA (US)

(72) Inventors: Craig Weissman, San Francisco, CA (US); Dave Moellenhoff, Orinda, CA (US); Simon Wong, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 641 days.

This patent is subject to a terminal disclaimer.

(21) Appl. No.: 13/873,146

(22) Filed: Apr. 29, 2013

(65) Prior Publication Data

US 2013/0246450 A1    Sep. 19, 2013

Related U.S. Application Data

(63) Continuation of application No. 13/620,067, filed on Sep. 14, 2012, now Pat. No. 9,275,105, which is a
(Continued)

(51) Int. Cl.
*G06F 17/30*      (2006.01)

(52) U.S. Cl.
CPC .. *G06F 17/30442* (2013.01); *G06F 17/30528* (2013.01); *G06F 17/30536* (2013.01)

(58) Field of Classification Search
CPC ......... G06F 17/30442; G06F 17/30528; G06F 17/30536
See application file for complete search history.

(56) References Cited

U.S. PATENT DOCUMENTS 5,072,370 A    12/1991   Durdik
5,544,355 A     8/1996   Chaudhuri et al.
(Continued)

FOREIGN PATENT DOCUMENTS

EP         1665102      6/2006
WO      0177787     10/2001
(Continued)

OTHER PUBLICATIONS

Oracle, "Oracle9i Data Cartridge Developer's Guide," Internet, [Online] Mar. 2002 pp. 1-28, XP002406393, Retrieved from the Internet: URL: http://www.lc.leidenuniv.nl/awcourse/oracle/appdev.920/a98595.pdf> [retrieved on Nov. 8, 2006].
(Continued)

*Primary Examiner* — Scott A. Waldron
*Assistant Examiner* — Hubert Cheung
(74) *Attorney, Agent, or Firm* — Meyertons, Hood, Kivlin, Kowert & Goetzel, P.C.

(57) ABSTRACT

In embodiments, methods and systems for improving a query in a database system are provided. These method and system embodiments can enable greater contextual knowledge about the types and use of data in tables underlying a relational database to be employed to improve query efficiency. By employing contextual information, embodiments can provide improved queries and/or make recommendations to a query optimizer of a database system to improve its operation based upon knowledge of the data and/or application gathered. Embodiments can be useful in improving query performance in multi-tenant database systems.

16 Claims, 8 Drawing Sheets

Related U.S. Application Data continuation of application No. 11/558,761, filed on Nov. 10, 2006, now Pat. No. 8,543,566, which is a continuation-in-part of application No. 10/669,523, filed on Sep. 23, 2003, now Pat. No. 7,529,728.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,737,592 A | 4/1998 | Nguyen et al. | |
| 5,751,949 A | 5/1998 | Thomson et al. | |
| 5,761,419 A | 6/1998 | Schwartz et al. | |
| 5,778,388 A | 7/1998 | Kawamura et al. | |
| 5,787,437 A | 7/1998 | Potterveld et al. | |
| 5,794,229 A | 8/1998 | French et al. | |
| 5,794,232 A | 8/1998 | Mahlum et al. | |
| 5,802,518 A * | 9/1998 | Karaev | G06F 17/30448 |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,930,764 A | 7/1999 | Melchione et al. | |
| 5,937,402 A | 8/1999 | Pandit | |
| 5,940,818 A | 8/1999 | Malloy et al. | |
| 5,940,819 A * | 8/1999 | Beavin et al. | |
| 5,941,947 A | 8/1999 | Brown et al. | |
| 5,950,190 A | 9/1999 | Yeager et al. | |
| 5,963,953 A | 10/1999 | Cram et al. | |
| 5,974,409 A | 10/1999 | Sanu et al. | |
| 5,987,471 A | 11/1999 | Bodine et al. | |
| 5,991,754 A | 11/1999 | Raitto et al. | |
| 6,064,656 A | 5/2000 | Angal et al. | |
| 6,085,191 A | 7/2000 | Fisher et al. | |
| 6,092,062 A | 7/2000 | Lohman et al. | |
| 6,092,083 A | 7/2000 | Brodersen et al. | |
| 6,112,198 A | 8/2000 | Lohman et al. | |
| 6,112,209 A | 8/2000 | Gusack | |
| 6,134,540 A | 10/2000 | Carey et al. | |
| 6,161,149 A | 12/2000 | Achacoso et al. | |
| 6,169,534 B1 | 1/2001 | Raffel et al. | |
| 6,173,439 B1 | 1/2001 | Carlson et al. | |
| 6,178,425 B1 | 1/2001 | Brodersen et al. | |
| 6,189,000 B1 | 2/2001 | Gwertzman et al. | |
| 6,189,011 B1 | 2/2001 | Lim et al. | |
| 6,195,653 B1 * | 2/2001 | Bleizeffer et al. | |
| 6,216,135 B1 | 4/2001 | Brodersen et al. | |
| 6,219,667 B1 | 4/2001 | Lu et al. | |
| 6,226,641 B1 | 5/2001 | Hickson et al. | |
| 6,233,617 B1 | 5/2001 | Rothwein et al. | |
| 6,233,618 B1 | 5/2001 | Shannon | |
| 6,236,996 B1 | 5/2001 | Bapat et al. | |
| 6,266,669 B1 | 7/2001 | Brodersen et al. | |
| 6,275,824 B1 | 8/2001 | O'Flaherty et al. | |
| 6,275,825 B1 | 8/2001 | Kobayashi et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,330,560 B1 | 12/2001 | Harrison et al. | |
| 6,336,137 B1 | 1/2002 | Lee et al. | |
| 6,341,288 B1 | 1/2002 | Yach et al. | |
| 6,345,288 B1 | 2/2002 | Reed et al. | |
| D454,139 S | 3/2002 | Feldcamp | |
| 6,353,821 B1 | 3/2002 | Gray | |
| 6,356,915 B1 | 3/2002 | Chtchetkine et al. | |
| 6,363,371 B1 * | 3/2002 | Chaudhuri | G06F 17/30463 |
| 6,367,077 B1 | 4/2002 | Brodersen et al. | |
| 6,377,955 B1 | 4/2002 | Hartmann et al. | |
| 6,393,605 B1 | 5/2002 | Loomans | |
| 6,397,207 B1 | 5/2002 | Bleizeffer et al. | |
| 6,405,220 B1 | 6/2002 | Brodersen et al. | |
| 6,434,550 B1 | 8/2002 | Warner et al. | |
| 6,438,562 B1 | 8/2002 | Gupta et al. | |
| 6,446,089 B1 | 9/2002 | Brodersen et al. | |
| 6,446,109 B2 | 9/2002 | Gupta | |
| 6,453,038 B1 | 9/2002 | McFarlane et al. | |
| 6,529,901 B1 * | 3/2003 | Chaudhuri | G06F 17/30463 |
| 6,529,909 B1 | 3/2003 | Bowman-Amuah | |
| 6,535,909 B1 | 3/2003 | Rust | |
| 6,549,908 B1 | 4/2003 | Loomans | |
| 6,550,057 B1 | 4/2003 | Bowman-Amuah | |
| 6,553,563 B2 | 4/2003 | Ambrose et al. | |
| 6,560,461 B1 | 5/2003 | Fomukong et al. | |
| 6,571,233 B2 | 5/2003 | Beavin et al. | |
| 6,574,635 B2 | 6/2003 | Stauber et al. | |
| 6,577,726 B1 | 6/2003 | Huang et al. | |
| 6,578,037 B1 | 6/2003 | Wong et al. | |
| 6,587,854 B1 * | 7/2003 | Guthrie | G06F 17/30471 |
| 6,601,087 B1 | 7/2003 | Zhu et al. | |
| 6,602,509 B1 | 8/2003 | Saint-Remy et al. | |
| 6,604,117 B2 | 8/2003 | Lim et al. | |
| 6,604,128 B2 | 8/2003 | Diec | |
| 6,609,148 B1 | 8/2003 | Salo et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,654,039 B1 | 11/2003 | Hollines, III et al. | |
| 6,658,417 B1 | 12/2003 | Stakutis et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,721,765 B2 | 4/2004 | Ghosh et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,757,805 B2 | 6/2004 | Wu | |
| 6,759,234 B1 | 7/2004 | Gefter et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,804,680 B2 | 10/2004 | Melli | |
| 6,823,384 B1 | 11/2004 | Wilson et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,839,680 B1 | 1/2005 | Liu et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,944,133 B2 | 9/2005 | Wisner et al. | |
| 6,947,927 B2 | 9/2005 | Chaudhuri et al. | |
| 6,950,848 B1 | 9/2005 | Yousefi'zadeh | |
| 6,988,109 B2 | 1/2006 | Stanley et al. | |
| 7,062,502 B1 | 6/2006 | Kesler | |
| 7,069,231 B1 | 6/2006 | Cinarkaya et al. | |
| 7,076,633 B2 | 7/2006 | Tormasov et al. | |
| 7,120,623 B2 | 10/2006 | Ganesan et al. | |
| 7,124,146 B2 | 10/2006 | Rjaibi et al. | |
| 7,139,749 B2 | 11/2006 | Bossman et al. | |
| 7,152,109 B2 | 12/2006 | Suorsa et al. | |
| 7,171,413 B2 | 1/2007 | Puz et al. | |
| 7,174,483 B2 | 2/2007 | Becher et al. | |
| 7,181,758 B1 | 2/2007 | Chan | |
| 7,185,192 B1 | 2/2007 | Kahn | |
| 7,206,805 B1 | 4/2007 | McLaughlin, Jr. | |
| 7,206,807 B2 | 4/2007 | Cheenath | |
| 7,209,929 B2 | 4/2007 | Dominguez, Jr. et al. | |
| 7,216,125 B2 | 5/2007 | Goodwin | |
| 7,249,118 B2 | 7/2007 | Sandler et al. | |
| 7,289,976 B2 | 10/2007 | Kihneman et al. | |
| 7,305,577 B2 | 12/2007 | Zhang | |
| 7,308,704 B2 | 12/2007 | Vogel et al. | |

(56) References Cited

U.S. PATENT DOCUMENTS

| | | |
|---|---|---|
| 7,340,411 B2 | 3/2008 | Cook |
| 7,340,481 B1 | 3/2008 | Baer et al. |
| 7,346,617 B2 | 3/2008 | Wong |
| 7,350,237 B2 | 3/2008 | Vogel et al. |
| 7,356,482 B2 | 4/2008 | Frankland et al. |
| 7,373,364 B1 | 5/2008 | Chapman |
| 7,401,094 B1 | 7/2008 | Kesler |
| 7,412,455 B2 | 8/2008 | Dillon |
| 7,434,257 B2 | 10/2008 | Garg et al. |
| 7,448,079 B2 | 11/2008 | Tremain |
| 7,484,219 B2 | 1/2009 | Mitra |
| 7,496,584 B2 | 2/2009 | Rjaibi et al. |
| 7,508,789 B2 | 3/2009 | Chan |
| 7,529,728 B2 | 5/2009 | Weissman et al. |
| 7,577,092 B2 | 8/2009 | San Andres et al. |
| 7,580,975 B2 | 8/2009 | Cheenath |
| 7,599,953 B2 | 10/2009 | Galindo-Legaria et al. |
| 7,620,655 B2 | 11/2009 | Larsson et al. |
| 7,661,027 B2 | 2/2010 | Langen et al. |
| 7,693,820 B2 | 4/2010 | Larson et al. |
| 7,698,160 B2 | 4/2010 | Beaven et al. |
| 7,716,077 B1 | 5/2010 | Mikurak |
| 7,734,608 B2 | 6/2010 | Fell et al. |
| 7,769,825 B2 | 8/2010 | Karakashian et al. |
| 7,774,366 B2 | 8/2010 | Fisher et al. |
| 7,779,039 B2 | 8/2010 | Weissman et al. |
| 7,814,052 B2 | 10/2010 | Bezar et al. |
| 7,814,142 B2 | 10/2010 | Mamou et al. |
| 7,814,470 B2 | 10/2010 | Mamou et al. |
| 7,827,138 B2 | 11/2010 | Salmon et al. |
| 7,849,401 B2 | 12/2010 | Elza et al. |
| 7,890,491 B1 | 2/2011 | Simmen |
| 8,015,495 B2 | 9/2011 | Achacoso et al. |
| 8,041,760 B2 | 10/2011 | Mamou et al. |
| 8,060,553 B2 | 11/2011 | Mamou et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,131,713 B2 | 3/2012 | Weissman et al. |
| 8,229,922 B2 | 7/2012 | Weissman et al. |
| 8,255,548 B2 | 8/2012 | Hopkins et al. |
| 8,275,763 B2 | 9/2012 | Weissman et al. |
| 8,275,836 B2 | 9/2012 | Beaven et al. |
| 8,280,874 B2 | 10/2012 | Weissman et al. |
| 8,280,875 B2 | 10/2012 | Weissman et al. |
| 8,321,405 B2 | 11/2012 | Weissman et al. |
| 8,332,387 B2 | 12/2012 | Weissman et al. |
| 8,335,781 B2 | 12/2012 | Weissman et al. |
| 8,359,647 B1 | 1/2013 | Casalaina et al. |
| 8,386,450 B2 | 2/2013 | Simmen |
| 8,457,545 B2 | 6/2013 | Chan |
| 8,484,111 B2 | 7/2013 | Frankland et al. |
| 8,572,058 B2 | 10/2013 | Reid et al. |
| 8,606,790 B2 | 12/2013 | Weissman et al. |
| 2001/0023440 A1 | 9/2001 | Franklin et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0052862 A1 | 5/2002 | Scott |
| 2002/0069193 A1* | 6/2002 | Beavin et al. .................... 707/2 |
| 2002/0069369 A1 | 6/2002 | Tremain |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0133392 A1 | 9/2002 | Angel et al. |
| 2002/0133484 A1 | 9/2002 | Chau et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0156756 A1 | 10/2002 | Stanley et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2002/0198775 A1 | 12/2002 | Ryan |
| 2003/0004971 A1 | 1/2003 | Gong et al. |
| 2003/0009446 A1 | 1/2003 | Agarwal et al. |
| 2003/0014394 A1 | 1/2003 | Fujiwara et al. |
| 2003/0018705 A1 | 1/2003 | Chen et al. |
| 2003/0018830 A1 | 1/2003 | Chen et al. |
| 2003/0065648 A1 | 4/2003 | Driesch, Jr. et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0088579 A1 | 5/2003 | Brown et al. |
| 2003/0120675 A1 | 6/2003 | Stauber et al. |
| 2003/0151633 A1 | 8/2003 | George et al. |
| 2003/0154197 A1 | 8/2003 | Millet et al. |
| 2003/0159136 A1 | 8/2003 | Huang et al. |
| 2003/0182276 A1 | 9/2003 | Bossman et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0229617 A1 | 12/2003 | Rjaibi et al. |
| 2004/0001092 A1 | 1/2004 | Rothwein et al. |
| 2004/0010488 A1* | 1/2004 | Chaudhuri ........ G06F 17/30463 |
| 2004/0010489 A1 | 1/2004 | Rio |
| 2004/0015578 A1 | 1/2004 | Karakashian et al. |
| 2004/0015981 A1 | 1/2004 | Coker et al. |
| 2004/0019587 A1 | 1/2004 | Fuh et al. |
| 2004/0027388 A1 | 2/2004 | Berg et al. |
| 2004/0044656 A1 | 3/2004 | Cheenath |
| 2004/0044662 A1* | 3/2004 | Ganesan et al. .................. 707/5 |
| 2004/0045004 A1 | 3/2004 | Cheenath |
| 2004/0103019 A1 | 3/2004 | Reid et al. |
| 2004/0103089 A1 | 5/2004 | Lane et al. |
| 2004/0111410 A1 | 6/2004 | Burgoon et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0220952 A1 | 11/2004 | Cheenath |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0004907 A1* | 1/2005 | Bruno ............... G06F 17/30469 |
| 2005/0044426 A1 | 2/2005 | Vogel et al. |
| 2005/0050041 A1 | 3/2005 | Galindo-Legaria et al. |
| 2005/0050046 A1 | 3/2005 | Puz et al. |
| 2005/0050555 A1 | 3/2005 | Exley et al. |
| 2005/0065925 A1* | 3/2005 | Weissman ......... G06F 17/30442 |
| 2005/0071345 A1 | 3/2005 | Lin |
| 2005/0091098 A1 | 4/2005 | Brodersen et al. |
| 2005/0097097 A1 | 5/2005 | Hunt et al. |
| 2005/0223022 A1 | 10/2005 | Weissman et al. |
| 2005/0240354 A1 | 10/2005 | Mamou et al. |
| 2005/0283478 A1 | 12/2005 | Choi et al. |
| 2006/0021019 A1 | 1/2006 | Hinton et al. |
| 2006/0036576 A1 | 2/2006 | Simmen |
| 2006/0069717 A1 | 3/2006 | Mamou et al. |
| 2006/0095960 A1 | 5/2006 | Arregoces et al. |
| 2006/0100912 A1 | 5/2006 | Kumar et al. |
| 2006/0116976 A1 | 6/2006 | Legault et al. |
| 2006/0136382 A1 | 6/2006 | Dettinger et al. |
| 2006/0188913 A1 | 8/2006 | Krieg et al. |
| 2006/0230124 A1 | 10/2006 | Belfiore et al. |
| 2006/0288022 A1 | 12/2006 | Rjaibi et al. |
| 2007/0077978 A1 | 4/2007 | Walker et al. |
| 2007/0078705 A1 | 4/2007 | Abels et al. |
| 2007/0078950 A1 | 4/2007 | Hopkins et al. |

(56) References Cited

U.S. PATENT DOCUMENTS

| | | |
|---|---|---|
| 2007/0088741 A1 | 4/2007 | Brooks et al. |
| 2007/0124276 A1 | 5/2007 | Weissman et al. |
| 2007/0130117 A1 | 6/2007 | Lapstun et al. |
| 2007/0130130 A1 | 6/2007 | Chan et al. |
| 2007/0130137 A1 | 6/2007 | Oliver et al. |
| 2007/0150546 A1 | 6/2007 | Karakashian et al. |
| 2007/0156650 A1 | 7/2007 | Becker |
| 2007/0183978 A1 | 8/2007 | Preuss et al. |
| 2007/0198597 A1 | 8/2007 | Betz et al. |
| 2007/0226640 A1 | 9/2007 | Holbrook et al. |
| 2008/0010233 A1 | 1/2008 | Sack et al. |
| 2008/0010243 A1 | 1/2008 | Weissman et al. |
| 2008/0082540 A1 | 4/2008 | Weissman et al. |
| 2008/0082572 A1 | 4/2008 | Ballard et al. |
| 2008/0082586 A1 | 4/2008 | Jasik et al. |
| 2008/0082986 A1 | 4/2008 | Cheenath et al. |
| 2008/0086358 A1 | 4/2008 | Doshi et al. |
| 2008/0086447 A1 | 4/2008 | Weissman et al. |
| 2008/0086479 A1 | 4/2008 | Fry et al. |
| 2008/0086482 A1 | 4/2008 | Weissman |
| 2008/0086514 A1 | 4/2008 | Weissman et al. |
| 2008/0086567 A1 | 4/2008 | Langen et al. |
| 2008/0086735 A1 | 4/2008 | Cheenath et al. |
| 2008/0162544 A1 | 7/2008 | Weissman et al. |
| 2008/0201701 A1 | 8/2008 | Hofhansl et al. |
| 2008/0215560 A1 | 9/2008 | Bell et al. |
| 2008/0249972 A1 | 10/2008 | Dillon |
| 2008/0270354 A1 | 10/2008 | Weissman |
| 2008/0270987 A1 | 10/2008 | Weissman |
| 2008/0313162 A1* | 12/2008 | Bahrami ........... G06F 17/30967 |
| 2009/0030906 A1 | 1/2009 | Doshi et al. |
| 2009/0049065 A1 | 2/2009 | Weissman |
| 2009/0049101 A1 | 2/2009 | Weissman |
| 2009/0049102 A1 | 2/2009 | Weissman |
| 2009/0049288 A1 | 2/2009 | Weissman |
| 2009/0063415 A1 | 3/2009 | Chatfield et al. |
| 2009/0077010 A1* | 3/2009 | Muras et al. ........... G06F 17/30 |
| 2009/0100342 A1 | 4/2009 | Jakobson |
| 2009/0177744 A1 | 7/2009 | Marlow et al. |
| 2009/0276395 A1* | 11/2009 | Weissman et al. ..... G06F 17/30 |
| 2009/0276405 A1 | 11/2009 | Weissman et al. |
| 2009/0282045 A1 | 11/2009 | Hsieh et al. |
| 2009/0319529 A1 | 12/2009 | Bartlett et al. |
| 2010/0124083 A1 | 5/2010 | Tinsley, III et al. |
| 2010/0191719 A1 | 7/2010 | Weissman et al. |
| 2010/0205155 A1* | 8/2010 | Mito ................. G06F 17/30457 707/689 |
| 2010/0205216 A1 | 8/2010 | Durdik et al. |
| 2010/0211619 A1 | 8/2010 | Weissman et al. |
| 2010/0217758 A1 | 8/2010 | Weissman et al. |
| 2010/0223254 A1 | 9/2010 | Weissman et al. |
| 2010/0223255 A1 | 9/2010 | Weissman et al. |
| 2010/0223284 A1 | 9/2010 | Brooks et al. |
| 2010/0235837 A1 | 9/2010 | Weissman et al. |
| 2010/0274779 A1 | 10/2010 | Weissman et al. |
| 2010/0281014 A1 | 11/2010 | Weissman et al. |
| 2010/0281015 A1* | 11/2010 | Weissman et al. ..... G06F 17/30 |
| 2010/0281016 A1 | 11/2010 | Weissman et al. |
| 2011/0078213 A1* | 3/2011 | Bezar et al. .................. 707/805 |
| 2011/0082854 A1 | 4/2011 | Eidson et al. |
| 2011/0218958 A1 | 9/2011 | Warshavsky et al. |
| 2011/0246449 A1 | 10/2011 | Collins et al. |
| 2011/0247051 A1 | 10/2011 | Bulumulla et al. |
| 2011/0258225 A1 | 10/2011 | Taylor et al. |
| 2011/0282847 A1 | 11/2011 | Collins et al. |
| 2011/0282864 A1 | 11/2011 | Collins et al. |
| 2011/0282881 A1 | 11/2011 | Collins et al. |
| 2011/0283266 A1 | 11/2011 | Gallagher et al. |
| 2011/0320435 A1 | 12/2011 | Collins et al. |
| 2012/0042218 A1 | 2/2012 | Cinarkaya et al. |
| 2012/0047489 A1 | 2/2012 | Varadharajan |
| 2012/0054222 A1 | 3/2012 | Soby |
| 2012/0110020 A1 | 5/2012 | Weissman et al. |
| 2013/0013773 A1 | 1/2013 | Weissman et al. |
| 2013/0018890 A1 | 1/2013 | Rajan et al. |
| 2013/0046752 A1 | 2/2013 | Weissman et al. |
| 2013/0191418 A1 | 7/2013 | Martin, Jr. et al. |
| 2013/0191892 A1 | 7/2013 | Cadden et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jackobson et al. |
| 2015/0007050 A1 | 1/2015 | Jackobson et al. |
| 2015/0095162 A1 | 4/2015 | Jackobson et al. |
| 2015/0142596 A1 | 5/2015 | Jackobson et al. |
| 2015/0172563 A1 | 6/2015 | Jackobson et al. |

FOREIGN PATENT DOCUMENTS

| | | |
|---|---|---|
| WO | 2004059420 | 7/2004 |
| WO | 2005031514 | 4/2005 |

OTHER PUBLICATIONS

Lumpkin and Jakobsson, Oracle White Paper, Query Optimization in Orade9i, Feb. 2002, pp. 1-29.

Haydu and Subramanian, Oracle White Paper, Analytic SQL Features in Oracle9i, An Oracle Technical White Paper, Dec. 2001, pp. 1-31.

Guide to Client SQL Query Performance Tuning, Jun. 2002, http://www.agsrhichome.bnl.gov/Controls/doc/database/ppt.sub.--wuery.html-.

Grade Tuning Pack, Data Sheet—Oracle Corporation, http://otn.oracle.com/products/oracle9i/datasheets/oem.sub.--tuning/9IR2.-sub.--.

Venkataraman and Zhang, Heterogeneous Database Query Optimization in DB2 Universal Data Joiner, Proceedings of the 24th VLDB Conference, 1998, pp. 685-689, New York, USA.

Kollar, Statistics Used by the Query Optimizer in Microsoft SQL Server 2000, Nov. 2000, http://msdn.microsoft.com/library/en-us/dnsq12k/html/statquery.asp?f, pp. 1-8.

IBM, eserver, iSeries, DB2 Universal Database for ISeries—Database Performance and Query Optimization, 2000, 2001, 2002.

Oracle: "Oracle9i Data Cartridge Developer's Guide," Internet, [Online ] Mar. 2002, pp. 1-28, XP002406393, Retrieved from the Internet:URL: http://www.lc.leidenuniv.nl/oracle/appdev.920/a96595.pdf>[retrieved on Nov. 8, 2006].

Search/Examination Report dated Mar. 26, 2010 from European Patent Application No. 07863710.5, 5 pages.

Int'l Search Report and Examination Report from European Patent Application No. 07863710.5 dated Mar. 26, 2010, 5 pgs.

Office Action in European Application No. 07863710.5 dated May 17, 2017, 14 pages.

Ling, et al., "An evaluation of sampling-based size estimation methods for selections in database systems," Proceedings of the Eleventh International Conference on Data Engineering, Mar. 6-10, 1995, pp. 532-539.

* cited by examiner

| Org id | acc id | name | ...... | User ID Ownership |
|---|---|---|---|---|
| ood 1 | ood 1 | Enterprise Constellation | | |
| ood 1 | ood 2 | | | |
| ⋮ | ⋮ | | | |
| ood 1 | | | | |
| ood 2 | | | | |
| ood 2 | | | | |
| ⋮ | | | | |
| ood 2 | | | | |
| ⋮ | ⋮ | ⋮ | ⋮ | ⋮ |
| oodN | | | | |
| oodN | | | | |

*FIG. 3*

| 201 | acc id | User Group ID |
|---|---|---|
| org #1 | ood1 | Engineering |
|  |  | Bridge |
| org #2 |  |  |
|  |  |  |
| org #N |  |  |

400

| User Group ID | User Id |
|---|---|
| Engineering | Mr. Scott |
| Bridge | Capt Kirk Mr. Spock Mr. Sulu |
| ⋮ | ⋮ |

425

| User Group Id | No. rows visible |
|---|---|
| Engineering | 5 |
| Bridge | 100 |
| ⋮ | ⋮ |

450

| User Id | User below |
|---|---|
| Capt Kirk | Mr. Spock |
| Mr. Spock | Mr. Sulu |
| ⋮ | ⋮ |

| Custom entity id | org id | Val 0 (FK:acc id) | Val 1 (asset name) | Val 2 (asset value) | Val 3 (asset depreciation) | Val 4 (asset replacement date) |
|---|---|---|---|---|---|---|
| ao1....1 | ood 1 | | | | | |
| ao1....2 | ood 1 | | | | | |
| ... | ... | | | | | |
| ao1...38 | ood 1 | | | | | |
| ao2...39 | ood 1 | | | | | |
| ... | ... | | | | | |
| ao2...53 | ood 1 | 001............9 | | | | 20050601 |
| ao2...54 | ood 1 | 001............8 | | | | 20060921 |
| ... | ... | | | | | |
| ao2...61 | ood 1 | 001............10 | | | | 20070331 |
| ... | ... | | | | | |
| ao2...90 | ood 1 | | | | | |
| ao1...91 | ood N | | | | | |

FIG. 8

IMPROVING A MULTI-TENANT DATABASE QUERY USING CONTEXTUAL KNOWLEDGE ABOUT TENANT DATA

CROSS-REFERENCES TO RELATED APPLICATIONS

This application is a continuation of U.S. application Ser. No. 13/620,067, filed Sep. 14, 2012, which is a continuation of U.S. patent application Ser. No. 11/558,761 filed Nov. 10, 2006, which is a continuation in part application of U.S. patent application Ser. No. 10/669,523, filed Sep. 23, 2003, now issued U.S. Pat. No. 7,529,728, the entire disclosures of which are incorporated by reference for all purposes. The present application is also related to U.S. patent application Ser. No. 10/817,161, filed Apr. 2, 2004, now issued U.S. Pat. No. 7,779,039, entitled "CUSTOM ENTITIES AND FIELDS IN A MULTI-TENANT DATABASE SYSTEM," the entire disclosure of which is incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to database systems and more particularly to query optimization systems and methods for use in multi-tenant database systems.

BACKGROUND

In database systems, to access, retrieve and process stored data, a query is generated, automatically or manually, in accordance with the application program interface protocol for the database. In the case of a relational database, the standard protocol is the structured query language (SQL). SQL statements are used both for interactive queries for data from the database and for gathering data and statistics. The efficiency of the query method underlying the actual query is dependent in part on the size and complexity of the data structure scheme of the database and in part on the query logic used.

Conventionally, query optimizers can be used on any database, such as a relational database provided by Oracle™ a company with headquarters in Redwood Shores, Calif. Such query optimizers work generally as follows: for each table, column, or index, aggregate statistics are gathered (typically periodically or on demand by a database administrator ("DBA")). The gathered statistics typically include the total number of rows, average size of rows, total number of distinct values in a column or index (an index can span multiple columns), histograms of column values (which place a range of values into buckets), etc. The optimizer then uses these statistics to decide among a possible set of data access paths.

However, such conventional query optimizers fail when presented with situations such as when data is not homogeneously distributed throughout the database, because the optimizer is unaware that for specific columns the data may have different characteristics.

In the case of table joins, the optimizer's decisions may be even more important deciding which table to retrieve first can have a profound impact on overall query performance. Here again, by using system-wide aggregate statistics the optimizer might choose a query plan that is incorrect or inefficient when confronted with data that does not conform to the "normal" average of the entire database as determined from the gathered statistics.

Accordingly, it is desirable to provide systems and methods for improving database queries which overcome the above and other problems.

BRIEF SUMMARY

The present invention provides methods and systems for improving a query in a database system. These method and system embodiments can enable greater contextual knowledge about the types and use of data in tables underlying a relational database to be employed to improve query efficiency. By employing contextual information, embodiments can provide improved queries and/or make recommendations to a query optimizer of a database system to improve its operation based upon knowledge of the data and/or application gathered. Embodiments can be useful in improving query performance in multi-tenant database systems.

As used herein, the term multi tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term contextual information refers broadly to any information about the distribution or allocation of information in an underlying database, or the effects of specific operations on the data, including permissions by one or more tenants to access specific data or to perform specific operations in a multi-tenant database system.

In an aspect and by way of example, the present invention provides a method for improving a query in a database, that includes receiving a query directed to the database. Queries may be intercepted prior to reaching a relational database management system (RDBMS) associated with the database, and before reaching an optimizer of the RDBMS if the RDBMS is so equipped. The database stores tenant specific data such that at least two of the tenants may store at least a portion of tenant specific data into a common table within the database in a multi-tenant database implementation. In place of the query, an improved query is provided. The improved query is determined based at least in part, upon the query received and a set of contextual information. The contextual information describes a characteristic of the data specific to at least one of a plurality of tenants. This can enable embodiments to construct the improved query to be aware of the data specific to a tenant to which the improved query will be addressed.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 3 illustrates an example of objects represented as a main table in an embodiment.

FIG. 4 illustrates an example Many-to-Many (MTM) physical table capable of storing sharing information in an embodiment.

FIG. 8 illustrates an example le of a custom entity object including a custom table for a hypothetical company in an embodiment.

DETAILED DESCRIPTION

I. Multi-Tenant Database Overview

In embodiments, techniques for improving queries for databases can overcome deficiencies of conventional database query methods that have been inefficient for multi-tenant databases because such methods fail to account for certain characteristics of each tenant's data in a multi-tenant database organization. For example, while one tenant's data may include numerous short records having only one or two indexable fields, another tenant's data may include fewer, longer records having numerous indexable fields. Additionally, embodiments can provide improved queries that are custom entity and/or custom field aware, to meet the requirements of tenants that create such custom entities or custom fields, as described in U.S. patent application Ser. No. 10/817,161, now issued U.S. Pat. No. 7,779,039, incorporated by reference herein in its entirety.

In addition to structural (schema) differences, the distribution of data among different tenants in a multi-tenant database may be quite different, even when tenant schemas are similar. Modern relational databases rely on statistics-based query optimizers that make decisions about the best manner to answer a query given accurate table-level and column-level statistics that are gathered periodically. Importantly, however, because existing relational databases are not multi-tenant aware, these statistics cut across all tenants in the database. That is, the statistics that are gathered are not specific to any one tenant, but are in fact an aggregate or average of all tenants. This approach can lead to incorrect assumptions and query plans about any one tenant.

In general, one goal of a query optimizer is to minimize the amount of data that must be read from disk (e.g., because disk access may be a slow operation). The optimizer therefore typically chooses tables or columns that are most "selective"—that is, will yield the fewest rows when the query condition is evaluated. For instance, if a single query filters on two columns of a single table, and both columns are indexed, then the optimizer will use the index that has the highest number of distinct values because statistically for any given filter value a smaller number of rows are expected to be returned. If the optimizer determines that a certain column has a very high cardinality (number of distinct values) then the optimizer will choose to use an index on that column versus a similar index on a lower cardinality column. Conventionally, the optimizer assumes relatively even distribution of data and therefore reaches the conclusion that the high-cardinality column is likely to yield a smaller number of satisfying-rows for a given equality filter. Next, mechanisms and methods for providing improved queries to databases that overcome these and other shortcomings of conventional query optimizers will be described with reference to example embodiments.

Figure 1:
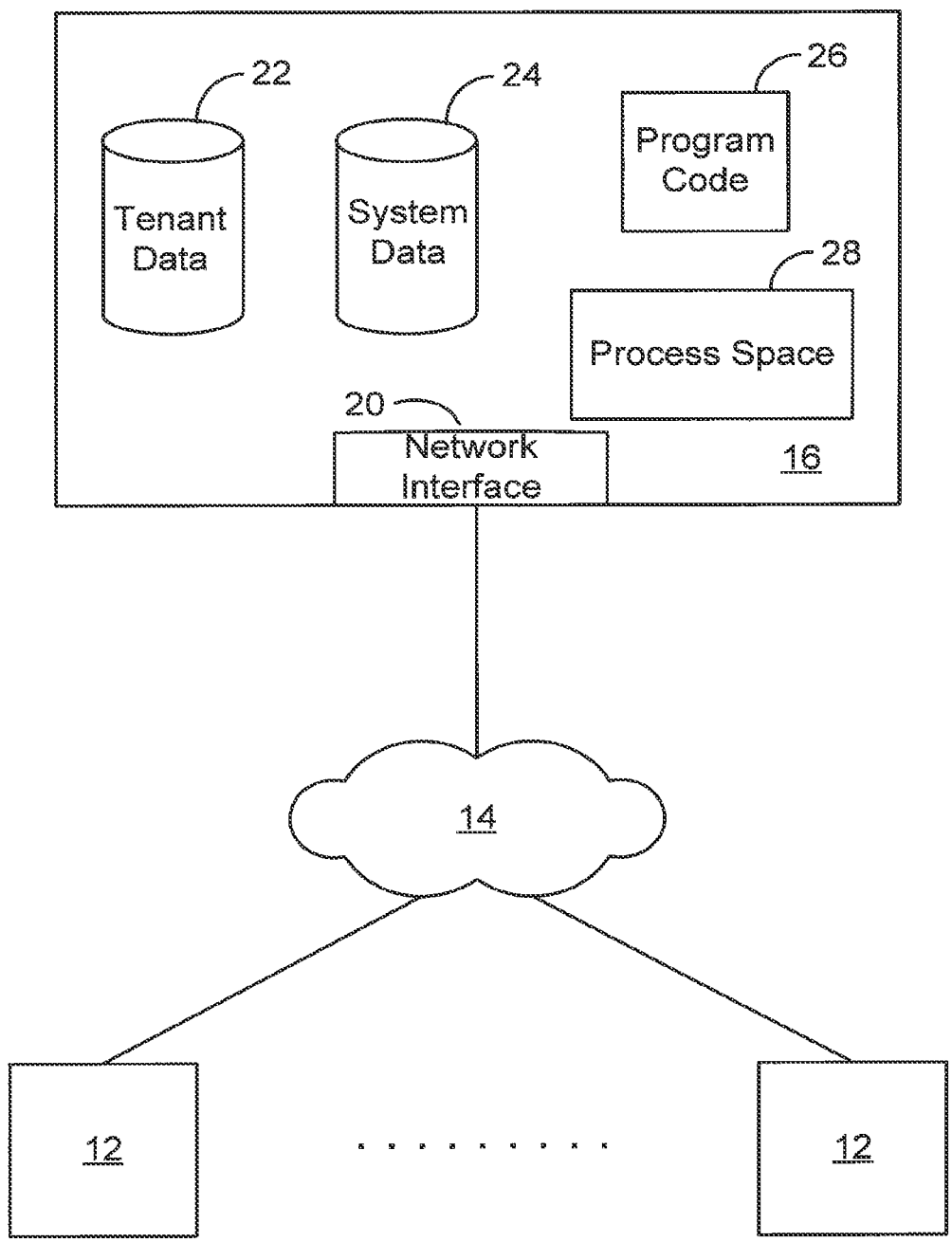
FIG. 1 illustrates an environment wherein a multi-tenant database system (MTS) might be used in an embodiment.

FIG. 1 illustrates an environment wherein a multi-tenant database system might be used. As illustrated in FIG. 1 (and in more detail in FIG. 2) any user systems 12 might interact via a network 14 with a multi-tenant database system (MTS) 16. The users of those user systems 12 might be users in differing capacities and the capacity of a particular user system 12 might be entirely determined by the current user. For example, where a salesperson is using a particular user system 12 to interact with MTS 16, that user system has the capacities allotted to that salesperson. However, while an administrator is using that user system to interact with MTS 16, that user system has the capacities allotted to that administrator.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" with a capital "I," that will be used in many of the examples herein, but it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such HTTP server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least as for the users that are accessing that server.

In aspects, the system shown in FIG. 1 implements a web-based customer relationship management (CRM) system. For example, in one aspect, MTS 16 can include application servers configured to implement and execute CRM software applications as well as provide related data, code, forms, web pages and other information to and from user systems 12 and to store to, and retrieve from, a database system related data, objects and web page content. With a multi-tenant system, tenant data is preferably arranged so that data of one tenant is kept separate from that, of other tenants so that one tenant, does not have access to another's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Some elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs an HTTP client, e.g., a browsing program, such as Microsoft's Internet Explorer™ Netscape's Navigator™ browser, Opera's browser, or a WAP-enabled browser in the case of a cell phone, PDA or other wireless device, or the like, allowing a user (e.g., subscriber of a CRM system) of user system 12 to access, process and view information and pages available to it from MTS 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms and other information provided by MTS 16 or other systems or servers. As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel PENTIUM™ processor or the like. Similarly, MTS 16 (and additional instances of MTS'S, where more than one is present) and all of their components might be operator configurable using application(s) including computer code run using a central processing unit such as an PENTIUM™ processor or the like, or multiple processor units. Computer code for operating and configuring MTS 16 to intercommunicate and to process web pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded front a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, JAVA™, JAVASCRIPT™, any other scripting language, such as VBScript and many other programming languages as are well known.

According to one embodiment, each MTS 16 is configured to provide web pages, forms, data and media content, to user systems 12 to support, the access by user systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., RDBMS) as is well known in the alt. It should also be understood that "server system" and "server" are often used interchangeably herein. Similarly, the databases described herein can be implemented as single databases, a distributed database, a collection of distributed databases, a database with redundant online or offline back-ups or other redundancies, etc., and might include a distributed database or storage network and associated processing intelligence.

Figure 2:
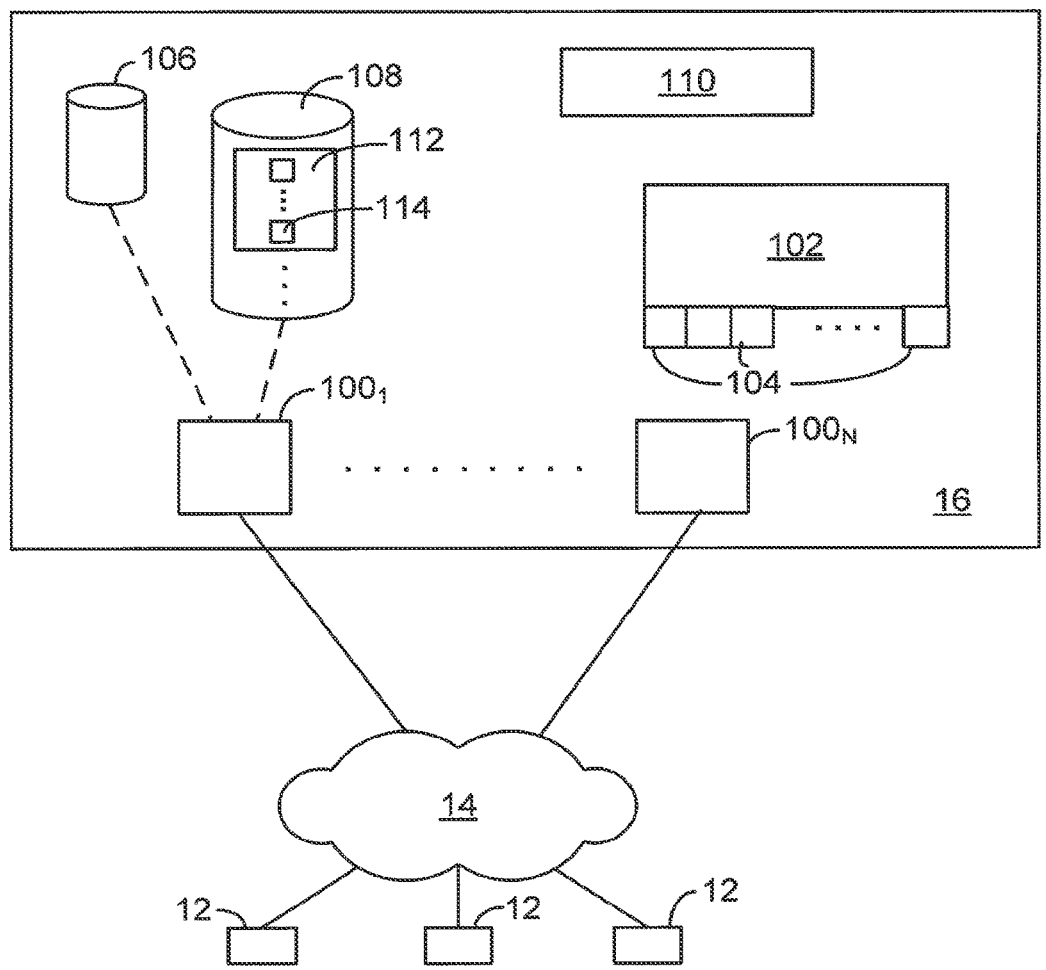
FIG. 2 illustrates elements of an MTS and interconnections therein in air embodiment.

FIG. 2 illustrates elements of MTS 16 and various interconnections in an embodiment. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might similarly be allocated for each user.

It should also be understood that each application server 100 may be communicably coupled to database systems, e.g., system database 106 and tenant database(s) 108, via a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In aspects, each application server 100 is configured to handle requests for any user/organization. Because it is desirable to be able to add and remove application servers from the server pool at any time for any reason, there is preferably no server affinity for a user anchor organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of different objects and data across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, etc., all applicable to that user's personal sales process (e.g., in tenant database 108). In one MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's sales data might be separate from other users' sales data regardless of the employers of each user, some data might be organization-wide data shared or accessible by a plurality of users or all of the sales force for a given organization that is a tenant. Thus, there might be some data structures managed by MTS 16 that are allocated at the tenant level while other data structures might be managed at the user level. Because an MTS might support multiple tenants including possible competitors, the MTS should have security protocols that keep data, applications and application use separate. Also, because many tenants will opt for access to an MTS rather than maintain their own system, redundancy, up-time and backup are more critical functions and need to be implemented in the MTS.

In addition to user-specific data and tenant-specific data, MTS 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. MTS 16 (e.g., an application server 100 in MTS 16) generates automatically one or more SQL statements (the SQL query) designed to access the desired information.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided. For CRM database applications, such standard entities might include tables for Account, Contact, Lead and Opportunity data, each containing pre-defined fields.

FIG. 3 illustrates an example of objects represented as a main table 200. In the specific example shown in FIG. 3, the main table 200 (.account) represents a standard Account entity. As shown, main table 200 includes an organization ID ("org id") column 201 and a table ID (e.g., "ace id" for account id) column 202 that acts as the primary key for table 200. Data table 200 also includes a plurality of data columns 203. Data table 200 may also include column 209 [add number to diagram] that stores the user ID of the user that owns or created the specific account that is stored in that row.

The org id column 201 is provided to distinguish among organizations using the multi-tenant account table 200. As shown, N different organizations have data stored in table 200. The org ids in column 201 are defined as Char(15) in an example implementation, but may include other data types. In one aspect, the first 3 characters of the org id is set to a predefined prefix, such as "00d", although another subset of characters in the org id may be used to hold such a prefix if desired.

In the specific example of FIG. 3, where the table represents a standard entity, data columns 203 are the predefined data columns, or standard fields, that are provided to the various organizations that might use the table. In the standard Account entity example, such standard fields might include a name column, a site column, a number of employees column and others as would be useful for storing account-related information. Each of the data columns 203 is preferably defined to store a single data type per column.

II. Improving Queries for Use in an MTS Environment

A. Problems of MTS Ordinary Databases

Now, consider in a multi-tenant system one of the data columns 203 that is shared by many tenants and that has a large number of distinct values for most tenants, but a small number of distinct values for a specific tenant, e.g. org #2. For this latter tenant, a typical database optimizer will choose to use this overall-high-cardinality column in error because the optimizer is unaware that for this specific tenant the column is not selective.

In the case of table joins, the optimizer's decisions may be even more important as deciding which table to retrieve first can have a profound impact on overall query performance. Here again, by using system-wide aggregate statistics, a conventional query optimizer might choose a query plan that is incorrect or inefficient for a single tenant that does not conform to the "normal" average of the entire database.

As a specific example of the importance of table joins, consider a private sharing feature that allows groups defined within a particular tenant(s) to share information only among members of that group provided in certain embodiments. This private sharing feature allows a specific list of users to have access to privileged data, for example, such as specific accounts or opportunities. It is noteworthy that not all tenants will elect to enable private sharing for their implementations. Some tenants will elect public sharing paradigm instead. In a public sharing implementation, each user associated with a tenant sees every data row within the tenant's organization. Sharing tables, such as the Many-to-Many (MTM) physical table, e.g. table 400 of FIG. 4, for example are populated for private sharing implementations only and are joined in queries made by organizations using private sharing.

Table 400 of FIG. 4 illustrates an example storage mechanism for storing information by a tenant using a private sharing mechanism provided by an embodiment. It is noteworthy that table 400 is merely an illustrative example of one private sharing implementation and is not intended to limit embodiments to sharing only specific types or quantities of information. The MTM table 400 specifies that a user or group of users has access to a particular entity (e.g., account or opportunity) row. In the example MINI table 400 illustrated by FIG. 4, a particular organization assigned ace id "ood1" has two user group IDs, "Engineering" and "Bridge" defined. When displaying a list of all rows that the current user can see (possibly with a filter on the entity rows, such as the name of the account or the dollar amount of the opportunity) the query optimizer will choose between accessing this MTM table 400 from the user side (i.e., Engineering or Bridge) or the entity side (i.e., "ood1") of the relationship.

If an entity filter is highly selective (for instance, a particular account name such as "XYZ Corp") it will generally be more likely to provide a more efficient query by beginning the query access path from the account side. If, however, the entity is not filtered selectively, but a current user has access to a small amount of data, then the query optimizer should access rows in the MTM table 400 through the user side. Because in the above example, a conventional database system optimizer's native statistic methods may be insufficient to make this determination, since the native statistics will aggregate across multiple tenants and will not provide context into the current tenant's data, embodiments implementing private sharing provide mechanisms and methods for improving the original query prior to the query being submitted to the database.

It is noteworthy that, because of the wide range of business types, industries, and sizes potentially served by multi-tenant database systems-, the likelihood of data "skew" is greatly increased. That is, the statistical profile of the largest most complex tenants is likely to look very different from that of small or medium sized customers.

B. Embodiments that Provide "Hints" and Improved Queries Using Tenant-Level Statistics In embodiments implementing database systems provided by Oracle Inc., a company with headquarters in Redwood Shores, for example, override mechanisms are provided that affect the ORACLE™ native query optimizer. The use of query "Hints" enable the ability to choose explicitly an improved query plan. For instance, an improved SQL statement might mention the explicit order of table joins, or explicit index names to use (rather than letting the optimizer choose automatically). Another mechanism for controlling the query plan explicitly is to re-write the query using equivalent but different SQL, syntax. For instance, a single flat SQL statement can be re-written using a nested SELECT in the FROM clause of the outer query. Joins and semi-joins are sometimes inter-changeable. Anti-joins can be written using the MINUS operator, etc. All of these are examples of ways in which a programmatic SQL generator can alter the behavior of the query optimizer native to an underlying database by using contextual knowledge to change the query plan.

In certain aspects, a query optimizer native to a RDBMS, such as the query optimizer provided with the RDBMS by Oracle, may be configured or "tuned" by supplying appropriate "hints" to the native query optimizer. For example, when SQL is generated programmatically by the MTS, the tenant-level statistics are consulted and a dynamic decision is made as to the syntax of the query. As used herein the term tenant-level statistics is broadly defined as statistical quantities that, though they may mirror the underlying relational database statistics in many ways (for example, in one aspect they track the total number of distinct values for indexed columns), are kept on a per-tenant basis. In one embodiment, tenant level statistics may be stored in tables in tenant database storage areas 112. Similarly for important application functionality, such as the sharing feature, the NITS tracks the approximate number of rows to which each user has access and stores such statistics (e.g., tables stored in user storage areas 114 of database 108). Then, when a filtered sharing query arrives, the dynamically generated SQL includes the appropriate hints and structure to force a query plan that is improved.

In one aspect, metadata information about users and tenants/organizations and the data contained in entity rows for that tenant are tracked (e.g., relevant information and metadata stored to separate user-level and tenant-level data tables) in order to make choices about query access paths. These techniques can provide particular value for list-style queries such as reports. A variety of areas are targeted, a brief overview of some of these areas will next be given as an illustrative and non-limiting examples. In an embodiment, evaluation of a sharing model controls which users can see which records. These embodiments can distinguish between users that can see many rows in an organization (e.g., bosses) versus users who can see very few rows (e.g., lower level employees). In another embodiment, filters are selected based upon a determination which filters are the most selective for fields that contain enumerated lists of values (e.g., list of status values for an account, list of industries, list of states, etc.). In a further embodiment, the joining and tracking of specialized tables is made more efficient by using tenant-level statistics. In a yet further embodiment, a sharing model is combined with a proper choice of filters, e.g. which model or filter should lead the query and how should the other filters be organized in a query plan in order to improve the efficiency of the query. In a still yet further embodiment, tenant specific information may be used to improve a query. For example, if one field is expected to be non-null for one tenant but not necessarily for all tenants, embodiments can generate different. SQL for when the tenant's users filter on this field so that a query optimizer native to a database manager may benefit from the SQL generated in view of the field not being null in all cases for this tenant.

III. Improving the Search on Rows

A. Sharing Model

In embodiments, for each user in the system, an approximate count of the number of rows that the user can see is tracked for each entity type or organization that has a sharing model. This number of rows (as a percentage of the total number of entity rows for that organization) is used as a decision point by embodiments selecting between two different query paths. It has been determined empirically that users who can see most of the entity rows (e.g., bosses) benefit from a certain query structure, whereas users who can see a small percentage of the entity rows (e.g., lower level employees) benefit from a different query structure. Conventional approaches are not able to select between the two query paths without having an entirely different SQL provided via a programmatic decision.

In aspects, a query improver reads data from multi-tenant data tables and stores metadata (e.g., number of rows accessible per tenant or per user, or other metadata) to tenant-level tables or user-level tables in database 108. For example, a tenant-level metadata table might be stored to a tenant storage area 112 and a user-level table might be stored to a user storage area 114. In one aspect, the query improver includes a metadata generator that processes multi-tenant tables and produces tenant-level and user-level metadata tables, such as the tenant level metadata table 450 shown by FIG. 4. The query improver and metadata generator might execute in process space 110 or other process space. The query improver retrieves and processes the appropriate tables when preparing improved SQL queries. In other aspects, flags or tags may be implemented in the multi-tenant database tables to distinguish users and tenants.

The number of rows that are accessible by a tenant or user may be calculated based on the ownership of a row, which is tracked in column 209 of table 200. The ownership information can be entered when the row (e.g. account) is created or by other means and/or at other times depending upon implementation specific details. From this ownership data, metadata tables may be permanently created or calculated dynamically upon login of a user. Using such metadata, a user query may be improved prior to submission to an underlying database manager. If a user can see few rows, then a query may be improved by structuring the query to retrieve all of the data in those rows and then apply any desired filters to the data in the selected rows. For example, consider a query of the form: "Show me all accounts that I can see" in a private account sharing model. An example of a data model for sharing appears in FIG. 3 (middle table is sharing table, final table is the user/group "blowout" table which describes which users are contained in a group, or above a user in the role hierarchy (UG=User or Group)). According to one aspect, for a "lower level employee" user it is typically most advantageous to join these tables starting from the right, filtering on users Id to form a temporary result of the rows that can be seen. Because the user can not see many rows, this will yield a relatively selective path. An example query follows:

```
select a.name "ACCOUNT.NAME",
from sales.account a,
(select distinct s.account_—id
    from core.ug_blowout b, sales.acc_share s
        where s.organization_id = ?
        and b.organization_id = ?
        and b.users_id = ?
        and s.ug_id = b.ug_id
        and s.acc_access_level > 0) t,
    core.users u
where (t.account_id = a.account_id)
and (u.users_id = a.owner)
and (a.deleted = '0')
and (a.organization_id = ?)
and (u.organization_id = ?))
```

Conversely for a "boss" riser who can see most of the entity records in the organization, the query improver will select another way to access the data, e.g. by applying a selective filter on all rows of the desired tenant. If the metadata gathered for a boss (done by gathering up the ownership numbers for people beneath) indicates access to many rows, it is typically most advantageous to begin the query from the left and use a nested loop query plan onto the sharing table (acc_share), an example of which follows:

```
select
    a.name "ACCOUNT.NAME",
from
    sales.account a, core.users u
where (u.users_id = a.owner)
and (a.deleted = '0')
and (a.organization_id = ?)
and (exists (select 1
    from core.ug_blowout b,
        sales.acc_share s
    where s.organization_id = ?
    and b.organization_id = ?
    and b.users_id = ?
    and s.ug_id = b.ug_id
    and s.acc_access_level > 0
    and s.account_id = a.account_id))
and (u.organization_id = ?)
```

Note that this query in general runs in relatively constant (reasonable) time for all users in an organization. It may not be particularly fast since it must look at all top-level entity records, but it is suitable for a boss who can in fact see most records. The first "lower level employee" query runs much faster for users who in fact can not see many records, but it may run much slower for bosses who can see all records. This, again, is why it is desirable to have an accurate decision between the two paths.

In order to keep the metadata current, the percentage of rows that each and every user can see can be tracked. In one aspect, there are three ways in which a user might gain access to data in a private security model:

(1) Rows owned by the user or users below the user in the role hierarchy;

(2) Rows that are shared via sharing rules to a group to which this user belongs; and (3) Rows that are shared via manual/team sharing to this user (possibly via a group).

In one aspect, the total number of rows for each entity type for each organization is tracked (this is useful for any of the strategies above). Also, the total number of rows owned by each user in a metadata table is tracked.

Because (1) and (2) can be important reasons for tracking why a user has access entity records in some implementations, (this might be known empirically from how organizations use the system) the information needed to calculate the number of rows a user can see, at least approximately, can be determined from the role hierarchy metadata table 475 of FIG. 4 for example, in conjunction with the metadata table 450. These metadata tables can be used to determine the number of records owned by a user or his subordinates.

The sharing rule metadata, such as tables 400 or 450, can also be used along with the group definition metadata, such as table 425, to calculate the total number of rows visible for a given user via sharing rules. For example, tables 400 and 425 may be joined from the right so that all of the groups to which a user belongs is determined. The number of rows seen by each of these groups may then be obtained from table 450 and added together. Table 450 may be calculated from table 400 for each organization. It will be appreciated by those skilled in the art that, while these methods of determining users from metadata tables illustrated by FIG. 4 are specific to a particular tenant in a multi-tenant database, other metadata tables may be included to hold metadata for other tenants.

It is also noteworthy that, for the purpose of the heuristic decision between "boss" and "lower level employee," the sum of these two values is sufficiently close to the true value even though these two sets may overlap.

In one aspect, the use of metadata tables such as the metadata tables illustrated by FIG. 4 (which are generally much smaller than the actual entity tables which might have millions of rows) ensures that the calculation of visible rows will itself not require much time. In one aspect, the decision to use metadata tables to perform this calculation is itself cached in a user-information data structure kept by running application servers 100, e.g., with a timeout value. In this manner, even though the calculation itself may be relatively lightweight, it is only performed periodically while a user is logged in.

Besides user group ID, Table 450 could have a tenant, division, group or other type of identification. Thus, each one of the tables in an example embodiment illustrated by FIG. 4 may hold in tenant-level, user-level, or other level metadata based on a type of identification.

B. Division Predicate Pushing

In embodiments, a feature known as "Divisions" enables partitioning one tenant into "sub-tenants," This allows splitting a large entity, such as Accounts, into many smaller ones. Users can choose to work within one division at a time. Most of the large tables in the physical data model have an index on a physical division column. Whenever a user filters their top-level operation on the division field, the query improver "pushes this predicate" (i.e., carries forward this filter) not only into the top-level entity but also into any adjunct tables (most notably the custom field and sharing tables) that are known to share this same semantic division value. This can cause the entire query to run much faster for various different types of filter predicates and users because the number of rows seen by a user performing the search will be reduced to the number of rows in the division.

IV. Improving the Search on Columns in a MTS (Filter Choice)

A typical end user report execution includes a set of displayed columns from multiple tables along with a set of filter conditions. A typical report might join between three (3) and seven (7) (or more) main tables with filtering possibly occurring on one or more of these tables. Given the number of joins, the number of predicate filters that might occur in a query can be quite high. Thus, proper choices of which columns to use to join the tables can increase efficiency significantly over conventional database query optimizers that compute selectivity based on all indexes in the physical database, a method that is practically certain to succumb to data skew from uneven data distribution among tenants. In addition, certain filters, such as the sharing filter discussed above (which can take the form of an additional join or a nested sub-query), should be applied to assure that the end user only sees data to which the end user has been given access.

A. Choosing a Column to Improve a Query

The optimization of query searches may be prioritized based on the selectivity of the filters used on the columns. In one embodiment, the column with the highest cardinality is selected to lead the query. Each filter predicate may be examined in order from the main table to adjunct tables in search of the one with the highest cardinality. The search may be only for the one with the highest cardinality or all of the filter predicates may be put in order. The cardinality may be tracked in the following ways.

Information about enumerated "picklist" fields (those fields that are known to contain a small list of possible values) can be tracked in one aspect. For example, a cardinality for each picklist data column may be kept on a tenant, division, and/or custom entity basis. Examples of "picklist" fields include the list of priority values for a task and the list of industries for an account. These fields are often used as filters for executive reporting and data rollup reports. In addition to the values themselves, the approximate number of times each value appears in the actual entity table for that organization (tenant) can be tracked in the metadata. When a user provides a filter value such that the value appears infrequently for that organization, the overall query is preferably driven from that table and possibly from an index on that column, if such as index exists. For picklist fields, the metadata tracked and stored does not need to reflect the exact number of occurrences for each value, a reasonable estimate is sufficient and may be used in embodiments. Values missing from the metadata either do not occur at all, or occur infrequently, and thus such metadata can make good filters.

In one aspect, when a user runs a report with N filters, each filter is evaluated for expected selectivity. If, for example, the user filters on "California" and "Florida" from a list of states and it is known that these values represent, respectively, five percent (5%) and two percent (2%) of the overall rows, then it is assumed that the filter has a seven percent (7%) selectivity. Similarly if a Boolean field has 95% true values, then filtering on false appears attractive as a filter, whereas filtering on "Male" from a random list of people would not be very selective, since 50% reduction would not make a good filter condition.

The selectivity of the sharing condition is also considered in one aspect. For a user with very low (perhaps two percent (2%)) visibility, the sharing filter might prove to be the best starting point and therefore the query optimizer native to the RDBMS is instructed to begin with the filter, rather than one of the main entity tables such as, e.g., Account or Contact tables.

In one aspect, other filter types may be incorporated into the query improvement mechanism, in addition to semantic knowledge about the application. For example, if an organization has imported all opportunities for the last three (3) years, and a user report filters on "all opportunities that closed in the last week" then this is likely to represent a selective filter. The presence of custom field indexes (e.g., a certain set of columns that administrators can choose to place into a B-tree indexed custom field columns into these heuristic decisions) are also factored in one aspect, as will be discussed below.

In one aspect, a query is only hinted to the RDMS optimizer if it is likely that a particular starting table will yield a selective path. All other tables would then be joined via nested loops. Importantly, embodiments can make tenant-level data decisions based on tenant-level metadata and user-level data decisions based on user-level metadata. Embodiments also can take into account application-level concepts such as sharing that are beyond the generic nature of the underlying RBDMS.

B. Using Denormalized Data Structures to Improve Queries

Embodiments can form an improved query that includes one or more references to a denormalized data structure that enables accessing names in the database stored in a name table, enabling customers to build indexes by copying denormalized field values into a universal indexed table, and using a "reverse index" to locate a foreign key from a parent to a child foreign key table. As used herein the term denormalized index table is defined as any indexed tables where instead of adding an Oracle-type index on a column of the regular multi-tenant wide table, the contents of that column are copied into a new separate narrow table, prior to adding Oracle-type indexes on the narrow table. Examples include SNL, CIV, and CFKV tables described herein below. To take advantage of the index, an SQL query is generated or rewritten to join to the narrow table. Denormalized table techniques can provide embodiments having the advantages of: (1) selectively copy the contents for one tenant but not for another tenant, so that resources are not wasted maintaining information if the tenant doesn't need indexing; (2) because there are so many columns in the regular multi-tenant wide table, it is not practical to add Oracle-type indexes to each and every one of them, however each tenant will likely need different columns to be indexed, and the requirements may change over time; (3) in the CIV table, Oracle-type indexes for string, number, and date contents, are separated out in order to support querying, filtering, and sorting of the different content types. Embodiments using denormalized data structures may create one or more the special purpose tables that may be joined and tracked with tenant-level metadata as will next be described with reference to examples.

In one embodiment and by way of example, metadata may be collected periodically on the core.custom_index_value and core.custom_foreign_key_value tables and -high cardinality values (histograms on a per-organization, per-field basis) stored. When a user filters for these values, the cardinality of the result can be estimated quite accurately in many cases based upon the stored metadata.

1. Search Name Lookup

Figure 5:
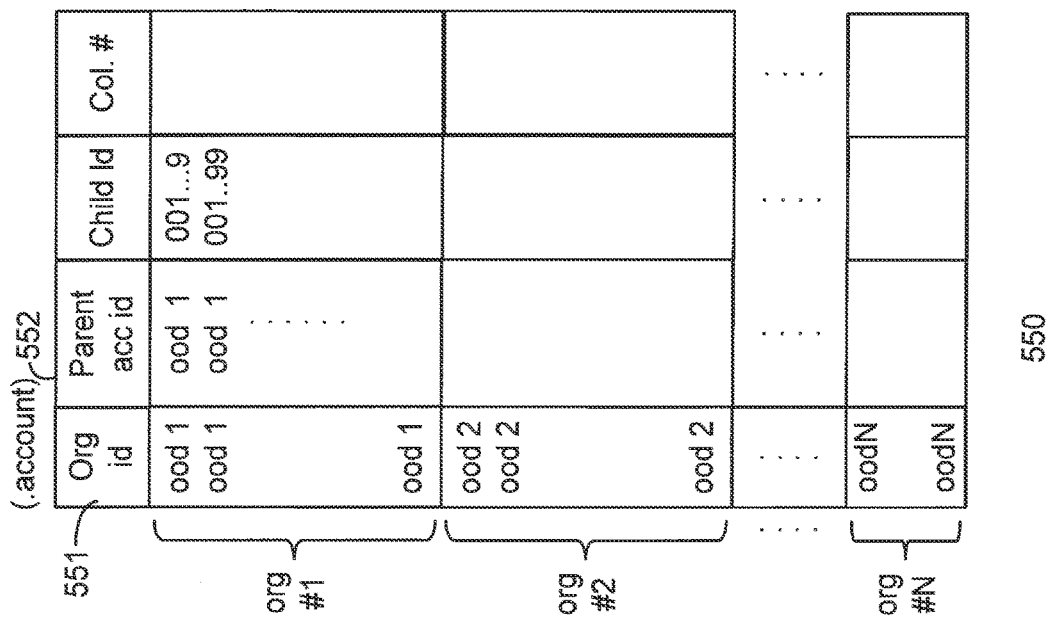
FIG. 5 illustrates an example search name lookup (SNL) table in an embodiment.
Figure 5:
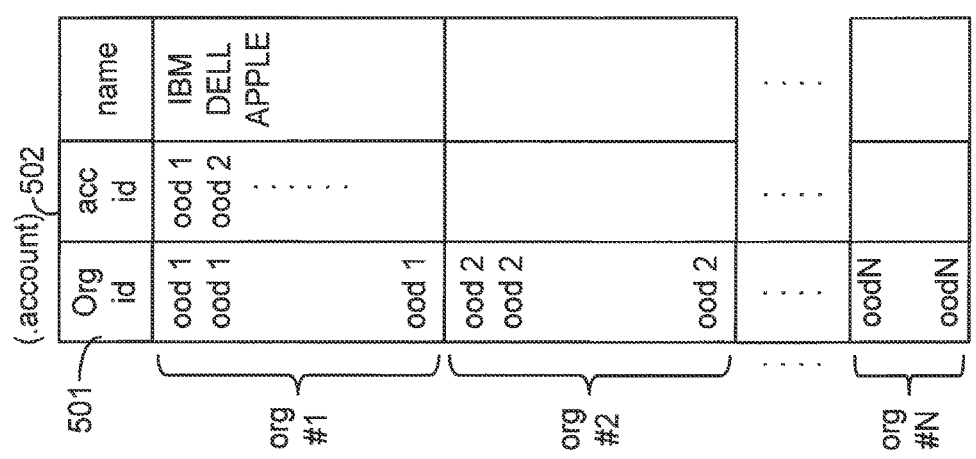

FIG. 5 shows a search name lookup (SNL) table according to an embodiment and by way of example. It is noteworthy that there are a wide variety of formats that can be used to organize the information in search name lookup table 500 and that there may be many different forms for the names. The names could be by first, last, both, reversed order of both (i.e. last name first) for example, just to name a few.

Accordingly, to address the issue of disparate name formats and to ensure that names are unique across multiple tenants, embodiments include a universal name table that stores all names known to the database. Any filter predicate against one of the known "name" columns (such as Account Name) must be routed first against this table in order to ensure that the name is being searched in the correct tenant data area so that the search can proceed properly. This universal name table is made available to the RDBMS native query optimizer with any query by providing the native query optimizer with access to table 500 when an improved query is passed to the native query optimizer in order to ensure that names are kept unique across multiple tenants in the database.

2. Custom Index Values

Each organization may add or define custom fields for inclusion in a custom field table. These custom fields may be inserted into any number of columns of the custom field. Custom fields for multiple tenants are stored in a single field within a custom field data structure, and this single field may contain different data types for each tenant.

Figure 6:
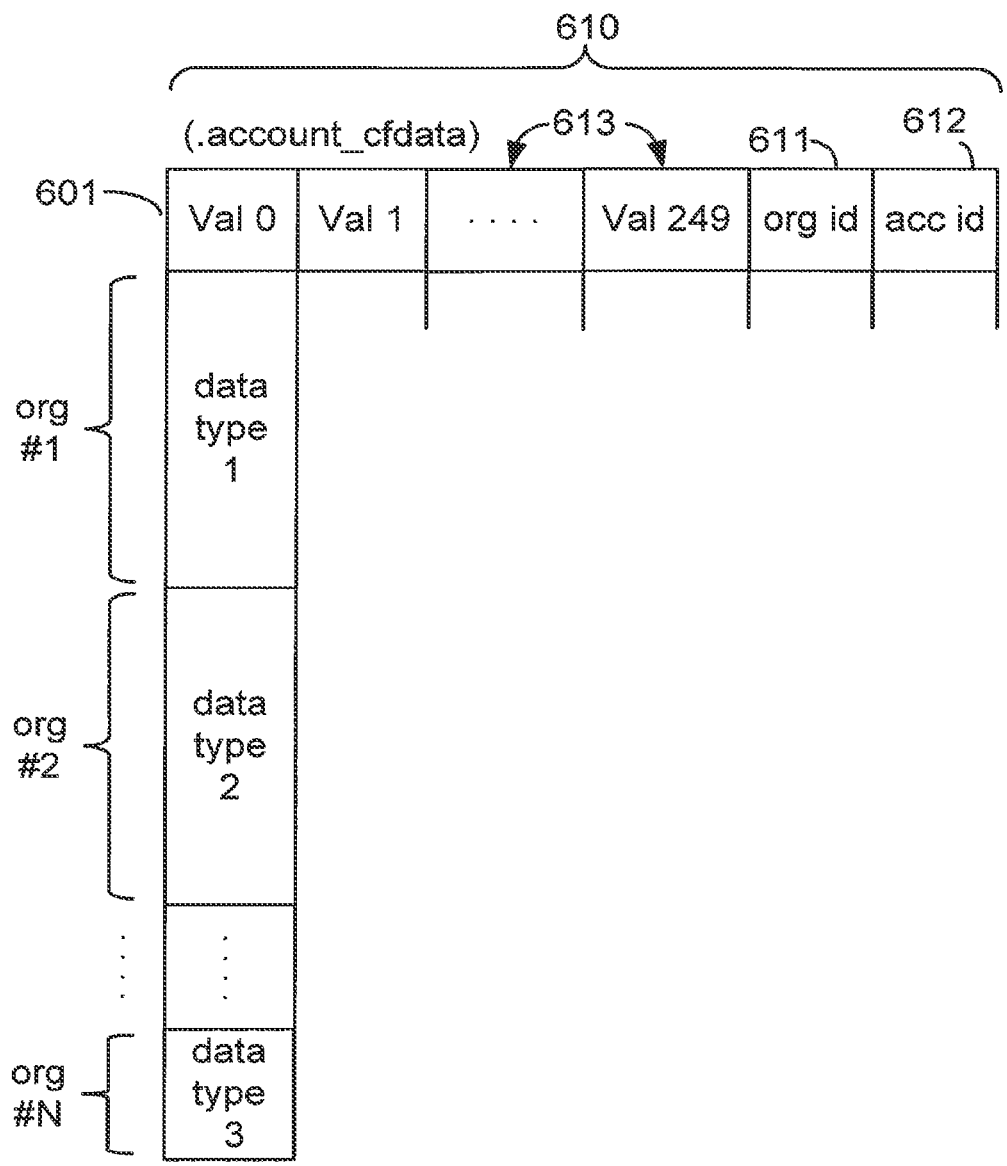
FIG. 6 illustrates an example custom field table in an embodiment.

FIG. 6 illustrates an example custom field table in an embodiment. Custom field table 610 similarly includes an org id column 611, a table id column 612 and plurality of data columns 613. As above, ace id column 612 acts as the primary key for table 610 and can include the same values as ace id column 202 of table 200. In the specific example shown, there is a plurality data columns 613 labeled as val0, val1 . . . val249. It is appreciated that any other number may be used as desired, such as, for example, 10 or 100. The account ID 612 may be used as the primary key values as they are globally unique.

In other databases the columns of a table are not indexed as this would create too much data and eventually not perform an efficient search. A benefit may be had in indexing some columns. The problem is how to know a priori, which columns will be useful to index. This would be particularly hard in a multi-tenant context since a column may be useful to index for one tenant and not useful for another tenant. A solution is to let the tenants decide which field is indexed for its part of the database. A tenant can add a name to this custom index value and decide for which column of information is indexed.

Now consider the problem of indexing the data in these custom field columns (e.g., columns 613) to allow for fast retrieval. For example, users expect to filter on date values as dates and numeric values as numbers. In order for these filters to work efficiently, given the expressions above used to convert their values, however, it would be necessary to place a functional index (e.g., an Oracle® DB functional index) on each organization's slice of the data in a given custom field column. This may not be possible, however, because the underlying RDBMS may not permit one physical column to contain data in multiple formats. For example, if one tries to create an index on the TO_DATE or TO_NUMBER expressions above, an error would result since other textual values in that physical column would not conform to the desired format.

For the reasons listed above, such "Indexed Custom Fields" are implemented in one embodiment by storing data in a separate set of indexed columns. According to one embodiment, a plurality of additional index columns is provided to allow for indexing custom fields. When a custom field is flagged for indexing by a database administrator, one of the index columns is allocated to that flagged column. Data from the flagged column is copied to the allocated index column. The data is stored in the index column in a format that facilitates searching, e.g., for dates and strings. For example, the YYYYMMDD is itself a searchable format as strings in that format can be compared lexically using normal string comparison.

Figure 7:
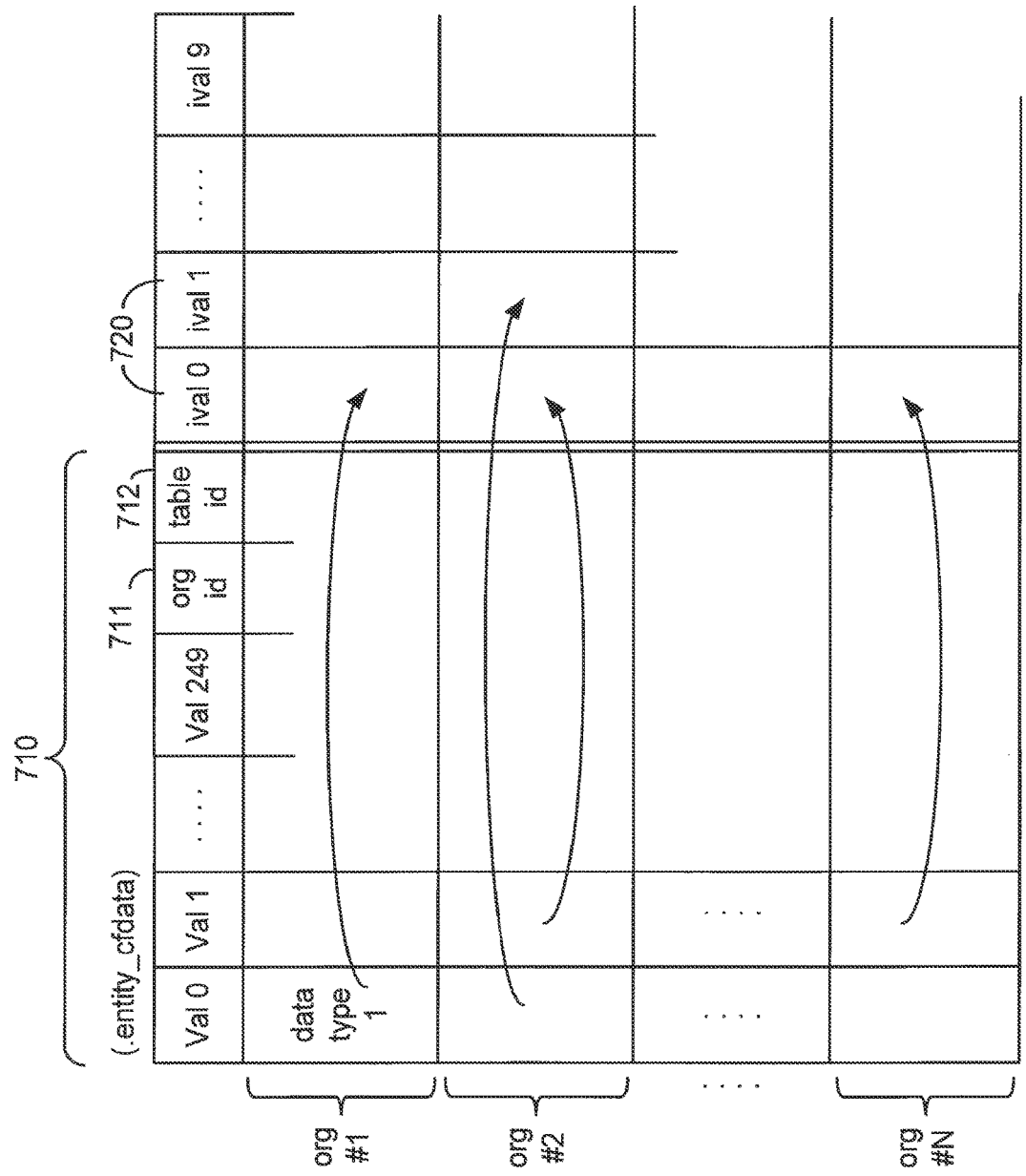
FIG. 7 illustrates an example of a custom object represented as a custom field table including physical index columns in an embodiment.

FIG. 7 illustrates an example of a custom object represented as a custom field table 710 including physical index columns 720 according to one embodiment. In one aspect, each custom field data table contains multiple (e.g., 10, 100, 250, etc.) physically indexed columns 720, e.g., using standard B*Tree indexes. In an example with ten (10) indexed columns, an administrator can therefore designate up to ten (10) custom fields, of string or date types, to be indexed. When a custom field is flagged for indexing, the data in the original column (which is still maintained to display the un-modified format to the user when necessary) is copied to one of these indexed columns. For example, as shown in FIG. 7, custom data field "val0" was flagged by the system administrator for organization 1 as an indexed custom column Data from this flagged column is copied to the index column "ival0", custom data field "val1" was flagged by the system administrator for organization 2 as an indexed custom column, and the data from this flagged column is copied to index column "ival0". At some later time, the system administrator for organization 2 may have flagged another custom field column and the data for this column is copied to another index column (e.g., column "val0" data copied to column "ival1" as shown in FIG. 7). In one aspect, similar to the custom fields, the lowest numbered index columns are used or filled first.

In order to enable customers to build their own indexes, denormalized field values are copied into a universal indexed table at indexed columns 720 (after normalizing text values for case-folded and case-insensitive searching, etc). These custom field values are made available to the RDBMS native query optimizer with any query that references at least one of the custom fields by providing the native query optimizer with access to table 720 when the custom fields are filtered.

3. Custom Foreign Key Value

Within the custom fields of a single tenant, a custom entity may also be created. Each custom entity type may have a different data type stored in the same physical column. The account ID may be used as the primary key values as they globally unique, but also include an object-specific identifier which may be re-used among different entities.

FIG. 8 illustrates an example of a custom entity object in an embodiment. Custom entity object 800 includes a custom table 810 for an organization. As shown, this organization (identified by "00d1" in org id column 801) has defined a custom object 810 to represent Assets. The definition of the custom fields that comprise the Assets object 810 is stored to metadata, e.g., in columns 613 of table 610 (FIG. 6). Assets object 810 has been allocated the prefix "a02" for the custom entity id. Also, as shown, the organization identified by "ood1" has defined another custom object, e.g., identified by prefix "a01" in custom entity id column 802. A separate column may be provided in table 800 to store the prefixes (e.g., "a01") of the various objects stored in table 800. Assets object 810 has been defined with a custom foreign key column and various data columns. The custom foreign key (FK) column is allocated to the "Val0" column, whereas data fields for "asset name", "asset value", "asset depreciation type" and "asset replacement date" have been allocated to columns "Val1" to "Val4", respectively. In this example, the data types for these fields are text, number, picklist and date, respectively.

Assets object 810 is a child custom object of Account object 500. The custom foreign key column connects each row in object 810 to its parent account (in these examples, Account object 500 has been allocated a prefix of "001" for its table id). For example, the foreign key value "001 . . . 9" connects to the row in table 500 for account name "DELL". Similarly, the foreign key values "001 . . . 8" and "001 . . . 10" connect to the rows in table 500 for account names "IBM" and "APPLE", respectively. Also, as shown, XYZ Corp, (identified by "00dN" in org id column 801) has defined a custom object to suit their business needs, which custom object is also stored in table 800. As such, any given data column 803 may contain mixed data types depending on the definitions of the various custom objects stored in table 800.

In order to allow an arbitrary number of foreign keys for each tenant embodiments can use a reverse index table 550 of FIG. 5 to "reverse index" the foreign key from parent to child. Without joining in this table no query can ever efficiently find all child rows for a particular parent, for one of the custom foreign keys. If an object has many children, it is hard to find all of the children efficiently. Thus, embodiments provide a table 550 of FIG. 5 that lists all of the children for a particular parent.

C. Rearranging Query (Query Normalization)

In an embodiment and by way of example, query normalization (combining disjunctions and conjunctions of similar predicates) is performed into a format that increases the ability for the above optimizations to be effective. For instance, a parallel list of OR equality conditions on one field can be combined into a single IN condition (before consulting our metadata) and a parallel set of AND conditions will be intersected into a single filter.

V. Combining Sharing and Filters

Armed with the knowledge about the selectivity of the current filter predicates (and other contextual information) along with knowledge of where the current user fits into the sharing model, embodiments can make intelligent decisions about evaluation sharing in one of the following three ways.

i. If the query leads with a small number of entity rows (either because the query starts with a set of Ids, such as when displaying search results, or because it can be determined that a filter predicate is selective) then the improved query is generated to include sharing evaluated with a nested loop query plan leading with the entity ids ii. Otherwise if the user cannot see many rows then the improved query is generated to include leading with the sharing tables and accessing the main entity via the owner field (which is indexed)

iii. Otherwise if the user is not an admin then the improved query is generated to include a hash semi-join against the full set of rows that the user can see.

In addition to enabling faster queries by having an additional indexable field, extra fields may have associated metadata. The metadata can be updated when the field is input, for example. With these metadata, a user query may be improved. For example, ownership metadata may be determined for how many rows are visible to a user. Thus, if a user can see few rows then a query may be optimized by retrieving all of the data in those rows. However, if the metadata gathered for a boss (done by gathering up the owernship numbers for people beneath) show access to many rows then the query improver will select another method for accessing the data.

VI. Maintaining Metadata

A. Sharing Model

In an aspect, metadata, including statistics, is tracked for user and organization quotas. In some aspects, such information is tracked periodically (e.g., on a scheduled basis—during off-peak hours, amortizing the work over multiple days), wherein the number of visible rows for each user is calculated exactly or approximately, or before every Nth query (e.g., every $10^{th}$ query) by a user, that user's visibility is calculated explicitly and then that statistic is used until it is again calculated (here it is assumed that users do not change very often front one strategy to another). In yet a further aspect, whenever an unconstrained query is run, the number of visible rows is remembered and that number is used until the user runs the next unconstrained query.

When data is created, certain statistics are entered into the table, such as ownership, tenant, user-id, and other statistics mentioned herein. This may be termed being done at the data manipulation layer (DML) time. In this manner, such fields may be used to search based on the owner of the data. This information may also then be used to calculate how many other users may be able to view the information based on a hierarchical user structure within a tenant. For example, a manager will be able to see the accounts that people underneath have created. Accordingly, embodiments can provide a payoff in faster queries with little extra work when the data fields are being created.

B. Filter Selection

In one embodiment, each update or insert into an entity table passes through att application server 100. Therefore as the data is being processed in Java™ (Java is a trademark of Sun Microsystems, Inc.) counters are incremented and decremented for individual picklist values. Inserts increment a counter, while updates to a different value decrement a counter for the old value and increment a counter for the new value. Since these statistics do not need to be exact, the statistics metadata need not be updated with each and every database insert or update (which might affect performance). Rather, in one aspect, an in-memory cache server (which already contains the metadata for valid picklist values) is augmented with the counters for these values, with the ability to update the database values periodically to persist the changes. An example of such a cache server can be found in U.S. patent application Ser. No. 10/418,961, filed Apr. 17, 2003, titled "Java Object Cache Server for Databases", the contents of which are hereby incorporated by reference in its entirety.

For row deletion, the data need not pass through the application server 100. However, all main entities are soft-deleted (with a modification stamp), meaning the rows are left in the database for possible un-deletion. Therefore, an asynchronous process is used to update the statistics when rows are deleted and un-deleted since it is known which rows have been touched since the last running of that process.

VII. Pre-Fetch Queries

In some instances, metadata may be insufficient to determine whether a particular filter is selective. In such cases, an embodiment can issue a "pre-fetch" query looking for the number of rows directly in the database that match the filter (it will only do this if the answer to that question can be found easily, i.e. a simple fast query can be used as the pre-fetch, and a ROWNUM limit may be used to "exit early"). Normally issuing such a pre-query, possibly for many separate filters, would be considered too expensive in the general case, however, contextual knowledge can facilitate the ability to decide that the up-front cost is worth the effort e.g., before running a possibly very computationally expensive Management Report. In addition, embodiments may keep row counts for each entity for each tenant and factor this information into the decision of whether to pre-fetch.

While some metadata may be useful in giving an improved query, the improvement may only be in removing some possible retrieval paths while other retrieval paths may be seen as possibly being equivalent. When a retrieval path is seen as equivalent, a pre-query fetch may be used. A pre-query fetch looks at how many entries are in a specific retrieval path. If there are too many entries then that path is seen as not beneficial. This is different from other methods that look at random entries to gather metadata. These methods do not look at the results of an actual search, plus metadata from such a compilation will not be as directed since the actual search metadata will use the concepts such as ownership, tenant, and user-id to gather the metadata for the pre-query fetch and utilize the metadata in the most efficient manner given the structure of these known fields.

VIII. User-specific Sorting

User-specified sorting (some sorting logic is semantically rich). For instance sorting on multi-currency fields, i.e. a field supporting more than one currency (dollar, yen, euro, etc.) or sorting on translatable picklist fields, i.e., a picklist field able to be translated into various values, or sorting on special application fields such as ActivityDate which is time zone and Calendar specific, all require detailed knowledge of application design and functionality.

In an embodiment, the appropriate joins or inline views can be injected to achieve the correct application functionality, and may include augmentation by contextual information retrieved from other areas of the database (for instance in the case of picklist translation, embodiments may consult picklist Java-objects and create an Oracle in-memory array for hash joining).

IX. Row Limits

Row limits—most UI queries only need to display a small number of rows at a time, which can allow for SQL optimizations.

Embodiments can employ such techniques to enable critical query re-writing that is not possible at the underlying RBDMS optimizer by, for example determining that certain joins can be deferred until after the ROWNUM limit has been placed early in the query. This can be detected from contextual information because semantically an application employing the MTS will not change the results of a query with a particular join (for instance, joining to the user table to get the name from a user ID will never change the rows in the main query).

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A non-transitory computer readable medium having computer instructions stored therein that when executed by a computer system cause the computer system to perform operations comprising:

for each of at least two tenants in a multi-tenant database, computing the selectivity of different portions of that tenant's tenant-specific data based on at least two characteristics of that tenant's tenant-specific data other than characteristics identifying a user or tenant's access to data;

storing an indication of the computed selectivity of different portions of that tenant's tenant-specific data;

subsequent to the storing, receiving a query directed to tenant-specific data in the multi-tenant database of a particular one of the at least two tenants, wherein the query includes a plurality of query elements and has an associated query plan usable to implement the query;

evaluating the associated query plan based on the stored indication of the computed selectivity of different portions of the particular tenant's tenant-specific data;

based on the evaluating, modifying an ordering of query elements specified in the associated query plan to generate a modified query plan usable to implement the received query, wherein modification of the query plan is performed such that a first query element that is more selective of the particular tenant's tenant-specific data than a second query element is reordered within the query plan to be performed before the second query element; and providing, in place of the query plan, the modified query plan.

2. The non-transitory computer readable medium of claim 1, the operations further including storing at least one metadata table for use in determining the modified query plan.

3. The non-transitory computer readable medium of claim 2, wherein each of the stored metadata tables is associated with each of the at least two tenants.

4. The non-transitory computer readable medium of claim 2, wherein the at least one metadata table is used as a filter.

5. The non-transitory computer readable medium of claim 2, wherein the tenant-specific data is stored in the at least one metadata table for use in determining the modified query plan.

6. The non-transitory computer readable medium of claim 1, wherein a particular logical portion of the multi-tenant database includes one or more particular rows of the multi-tenant database, but not one or more other rows of the multi-tenant database.

7. The non-transitory computer readable medium of claim 1, wherein the selectivity of different portions of the tenant-specific data is based on the cardinality of the different portions of the tenant-specific data.

8. The non-transitory computer readable medium of claim 1, wherein the first query element is a first filter and the second query element is a second filter; the operations further comprising determining, based on the stored indication of the computed selectivity of different portions of the particular tenant's tenant-specific data, that the first filter is more selective of the particular tenant's tenant-specific data than the second filter.

9. The non-transitory computer readable medium of claim 8, wherein receiving the query includes receiving the query from a particular user associated with the particular tenant, wherein the particular user has access to a first potion of the particular tenant's tenant-specific data but not a second portion of the particular tenant's tenant-specific data, and wherein the first filter passes the first portion and filters out the second portion.

10. A method, comprising:
for each of at least two tenants in a multi-tenant database, computing, with a computer system, the selectivity of different portions of that tenant's tenant-specific data based on at least two characteristics of that tenant's tenant-specific data other than characteristics identifying a user or tenant's access to data;
storing an indication of the computed selectivity of different portions of that tenant's tenant-specific data;
subsequent to the storing, receiving a query directed to tenant-specific data in the multi-tenant database of a particular one of the at least two tenants, wherein the query includes a plurality of query elements and has an associated query plan usable to implement the query;
evaluating the associated query plan based on the stored indication of the computed selectivity of different portions of the particular tenant's tenant-specific data;
based on the evaluating, modifying an ordering of query elements specified in the associated query plan to generate a modified query plan usable to implement the received query, wherein modification of the query plan is performed such that a first query element that is more selective of the particular tenant's tenant-specific data than a second query element is reordered within the query plan to be performed before the second query element; and
executing the modified query plan in place of the query plan.

11. The method of claim 10, wherein the multi-tenant database includes a multi-tenant database table that is configured to allow each of the at least two tenants to access certain particular logical portions but not other logical portions.

12. The method of claim 10,
wherein the stored indication of selectivity of a particular tenant's tenant specific data is a denormalized index table for the particular tenant's tenant-specific data,
wherein the first query element is a first filter and the second query element is a second filter, and
wherein evaluating the associated query plan based on the stored indication of the computed selectivity of different portions of the particular tenant's tenant-specific data includes determining, based on the denormalized index table, that the first filter is more selective of the particular tenant's tenant-specific data than the second filter.

13. The method of claim 10,
wherein a first one of the different portions of a particular tenant's tenant-specific data includes a first plurality of values,
wherein the stored indication of the computed selectivity of the computed selectivity of different portions of that tenant's tenant-specific data includes statistics about respective proportions of the first plurality of values that are repeated occurrences of respective particular values, and
wherein the evaluating is based on the statistics about respective proportions of the first plurality of values that are repeated occurrences of respective particular values.

14. A non-transitory computer readable medium having computer instructions stored therein that when executed by a computer system cause the computer system to perform operations comprising, comprising:
for each of at least two tenants of a multi-tenant database, computing the selectivity of different portions of that tenant's tenant-specific data based on at least two characteristics of that tenant's tenant-specific data other than characteristics identifying a user or tenant's access to data:
storing an indication of the computed selectivity of different portions of that tenant's tenant-specific data;
subsequent to the storing, receiving a query directed to tenant-specific data in the multi-tenant database of a particular one of the at least two tenants, the query including a plurality of query elements and having an associated query plan usable to implement the query;
evaluating the associated query plan based on the stored indication of the computed selectivity of different portions of the particular tenant's tenant-specific data;
based on the evaluating, modifying an ordering of query elements specified in the associated query plan to generate a modified query plan usable to implement the received query, wherein modification of the query plan is performed such that a first query element that is more selective of the particular tenant's tenant-specific data than a second query element is reordered within the query plan to be performed before the second query element; and
executing the modified query plan in place of the query plan.

15. The non-transitory computer readable medium of claim 14, wherein the multi-tenant database includes a multi-tenant database table that is configured to allow each of the at least two tenants to access certain particular logical portions but not other logical portions.

16. The non-transitory computer readable medium of claim 15, wherein each of the respective different logical portions of the multi-tenant database table comprises one or more distinct rows of the multi-tenant database table.

* * * * *